United States Patent
Hai-Chun

(10) Patent No.: US 7,117,601 B2
(45) Date of Patent: Oct. 10, 2006

(54) COUNTERBALANCE MECHANISM

(75) Inventor: Huan Hai-Chun, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 23 days.

(21) Appl. No.: 11/064,215

(22) Filed: Feb. 23, 2005

(65) Prior Publication Data
US 2005/0193571 A1  Sep. 8, 2005

(30) Foreign Application Priority Data
Feb. 25, 2004 (CN) .................. 2004 1 0014179

(51) Int. Cl.
*B23D 49/00* (2006.01)
(52) U.S. Cl. .......................... 30/392; 30/394
(58) Field of Classification Search .......... 30/392; 83/698.11; 74/519
See application file for complete search history.

(56) References Cited

U.S. PATENT DOCUMENTS 3,945,120 A * 3/1976 Ritz ..................... 30/393
5,025,562 A * 6/1991 Palm ..................... 30/392
6,249,979 B1 * 6/2001 Bednar et al. ............ 30/392
6,286,217 B1 * 9/2001 Dassoulas et al. ......... 30/392
6,508,151 B1 * 1/2003 Neitzell .................. 83/34

FOREIGN PATENT DOCUMENTS

DE  41 08 982 A1  6/1992
FR  1 345 238 A   12/1963

* cited by examiner

*Primary Examiner*—Lowell A. Larson
*Assistant Examiner*—Sean Michalski
(74) *Attorney, Agent, or Firm*—Knobbe Martens Olson & Bear, LLP

(57) ABSTRACT

The present invention relates to a counterbalance mechanism for a reciprocating power tool in which a rocker cradle operatively connects or is coupled to a rocker arm driven by a rotary transmission mechanism to drive a counterweight in the opposite direction to that of the movement of the reciprocating rod so as to counteract the vibration produced by the reciprocating rod.

16 Claims, 5 Drawing Sheets

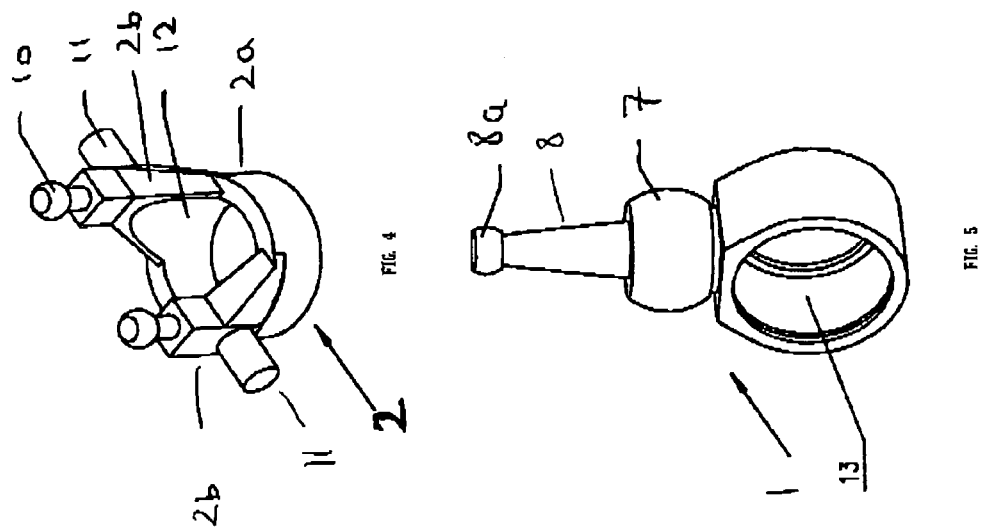
FIG. 4
FIG. 5
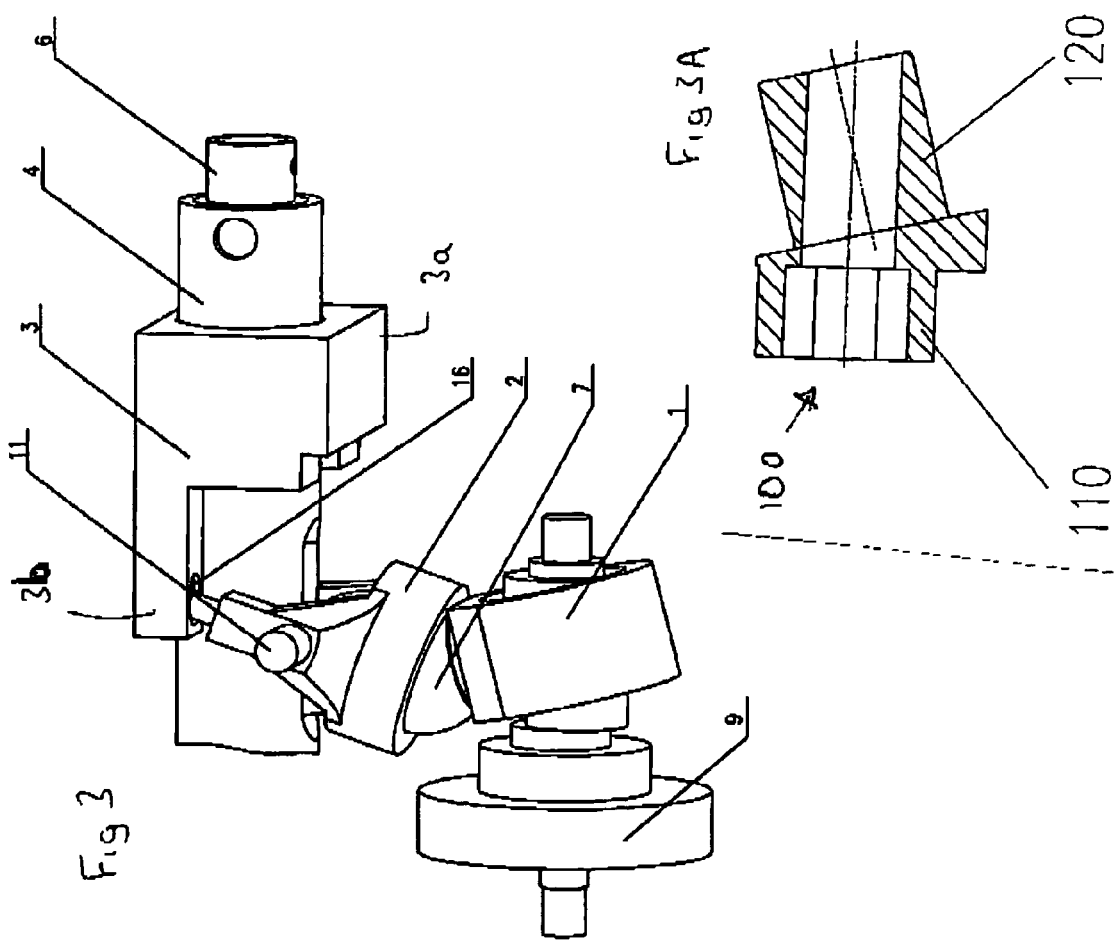
Fig 3
Fig 3A

COUNTERBALANCE MECHANISM

RELATED APPLICATIONS

This application claims priority to Chinese application no. 200410014179.2, filed Feb. 25, 2004, which is incorporated herein by reference.

FIELD OF THE INVENTION

The present invention relates to a counterbalance mechanism for a reciprocating power tool and to a reciprocating power tool per se.

BACKGROUND OF THE INVENTION

In the prior art, a power tool capable of performing a reciprocative cutting action often incorporates a counterweight to reduce vibrations caused by the reciprocating movement. In U.S. Pat. No. 6,286,217, a counterweight is driven by a pivot arm to perform reciprocating movement to reduce the vibration of the reciprocating rod. This increases the length of the housing in an axial direction. Moreover this involves a number of moving parts and is difficult to manufacture.

OBJECT OF THE INVENTION

An object of the present invention is to provide a counterbalance mechanism for a reciprocating power tool which can overcome the disadvantages of the prior art and use fewer accessories to achieve the same function.

SUMMARY OF THE INVENTION

In seeking to accomplish the object of the invention, the present invention provides a counterbalance mechanism which comprises a rotary transmission mechanism disposed in a gear box. A rocker arm has a lower end rotationally sleeved with the rotary transmission mechanism. A reciprocating rod is slidably disposed in the gear box. A counterweight can perform parallel sliding movement relative to the reciprocating rod. The upper drive section of the rocker arm engages the reciprocating rod. A rocker cradle is pivotally engaged with the gear box through its rotational axis. The lower section relative to the rotational axis actively engages the rocker arm. The upper section relative to the rotational axis engages the counterweight.

The present invention exploits a rocker cradle in engagement with the gear box and the rocker arm to drive the counterweight to perform reciprocating movement. It requires no increase in the length of the housing axially and relies on few accessories whilst being straightforwardly manufactured.

In one embodiment the present invention provides a counterbalance mechanism for a reciprocating power tool comprising:
- a rocker arm having a lower drive section and an upper drive section, wherein the lower drive section is radially mountable on a rotary transmission mechanism so as to impart to the rocker arm pendular articulateness about a first pivotal axis transverse to the axis of the rotary transmission mechanism,
- an elongate reciprocating rod capable of sliding movement in an axial direction, wherein the elongate reciprocating rod has a proximal end and a distal end and is capable of coupling the upper drive section of the rocker arm to an external cutting element at the distal end,
- a counterweight mounted radially on the reciprocating rod and capable of sliding movement in an axial direction opposite to the direction of sliding movement of the reciprocating rod,
- a rocker cradle pivotally mountable so as to be imparted with pendular articulateness about a second pivotal axis transverse to the axis of the rotary transmission mechanism, wherein the rocker cradle has an upper section engaged with the counterweight, and a lower section operatively connected or coupled to the rocker arm so that the rocker arm and the rocker cradle are imparted with opposite pendular articulateness about the first and second pivotal axes respectively.

The first and second pivotal axes are typically non-coincident. By being imparted with opposite pendular articulateness, when the rocker arm rocks backwards, the rocker cradle rocks forwards and when the rocker arm rocks forwards, the rocker cradle rocks backwards.

The elongate reciprocating rod at or near to the proximal end may be connected to the upper drive section of the rocker arm. Preferably the upper drive section of the rocker arm terminates in a ball which is captured in a socket at or near to the proximal end of the reciprocating rod.

Preferably the rocker arm has an intermediate drive section between the lower drive section and the upper drive section and the lower section of the rocker cradle forms an internal drive surface intimately contacting the external surface of the intermediate drive section.

Preferably the lower section of the rocker cradle is a part substantially spherical shell and the intermediate drive section of the rocker arm is a part substantially spherical intermediate drive section, wherein the part substantially spherical shell forms an internal drive surface intimately contacting the surface of the part substantially spherical intermediate drive section.

By this intimate contact, the lower section is operatively connected to the rocker arm so that the rocker arm and the rocker cradle are imparted with opposite pendular articulateness about the first and second pivotal axes respectively. To achieve intimate contact, the lower section of the rocker cradle may be seated (eg seated tangentially) on the intermediate drive section.

Preferably the lower section of the rocker cradle extends axially into opposed (preferably diametrically opposed) twin legs.

Particularly preferably the counterweight has a barrel-like body extending axially rearwards into twin arms and each arm contains a socket, wherein the twin legs of the rocker cradle each terminate in a ball which is captured in the socket so that the upper section of the rocker cradle is connected to the counterweight.

Preferably the rocker arm has an intermediate drive section between the lower drive section and the upper drive section, said counterbalance mechanism further comprising: a sleeve radially mounted on the intermediate drive section and connected to the lower section of the rocker cradle.

The sleeve serves to couple the lower section of the cradle to the rocker arm so that the rocker arm and the rocker cradle are imparted with opposite pendular articulateness about the first and second pivotal axes respectively.

Particularly preferably the rocker cradle further comprises a shift lever having an upper section and a lower section, wherein the lower section is connected to the sleeve and the upper section is connected to the counterweight.

Particularly preferably the sleeve is annular and extends radially outwardly into twin ears.

Particularly preferably the twin ears are provided with apertures and the twin legs of the rocker cradle each contain a receiving bore, wherein the rocker cradle further comprises a pair of shift levers, each shift lever has a lower portion, an upper portion and a middle portion therebetween, wherein the lower portion is received in the aperture of the sleeve, the middle portion passes through the receiving bore of the rocker cradle and the upper portion terminates in a ball which is captured in the socket so as to connect the shift lever to the counterweight.

In an alternative embodiment the invention provides a counterbalance mechanism comprises a transmission mechanism disposed in a gear box, a sway arm with lower end rotationally sleeved engaged with the transmission mechanism, a reciprocating rod slidably disposed in the gear box and a counterweight which can perform parallel slide movement relate to the reciprocating rod, the upper drive section of the sway arm engages with the reciprocating rod; characterized in that: the counterbalance mechanism further comprises a sway rack pivoted engages with the gear box through its rotational axis, and its lower section relative to the rotational axis actively engages with the sway arm, its upper section relative to the rotational axis engages with the counterweight.

Preferably the lower section of the sway rack relative to the rotational axis forms a drive surface, the sway arm forms a middle drive portion, and the middle drive portion spherically contacts the drive surface.

Preferably a sleeve covers the section located between the lower section and the upper section of the sway arm, the sleeve connects the lower section of the rack relative to the rotational axis.

Preferably the sway rack further comprises a shift lever with its lower portion connected to the sleeve and its upper portion connected to the counterweight.

In a further embodiment the present invention provides a reciprocating power tool comprising:

an elongate gear box;
a rotary transmission mechanism housed in the elongate gear box;
an external cutting element at the distal end; and
a counterbalance mechanism housed in the elongate gear box comprising:
  a rocker arm having a lower drive section and an upper drive section, wherein the lower drive section is radially mounted on the rotary transmission mechanism so as to impart to the rocker arm pendular articulateness about a first pivotal axis transverse to the axis of the gear box,
  an elongate reciprocating rod capable of sliding movement in an axial direction in the gear box, wherein the elongate reciprocating rod has a proximal end and a distal end and at or near to the proximal end couples the upper drive section of the rocker arm to the external cutting element at the distal end,
  a counterweight mounted radially on the reciprocating rod and capable of sliding movement in an axial direction in the gear box opposite to the direction of sliding movement of the reciprocating rod, and
  a rocker cradle pivotally mounted on the gear box so as to be imparted with pendular articulateness about a second pivotal axis transverse to the axis of the gear box, wherein the rocker cradle has an upper section engaged with the counterweight and a lower section operatively connected or coupled to the rocker arm so that the rocker arm and the rocker cradle are imparted with opposite pendular articulateness about the first and second pivotal axes respectively.

Preferably the rotary transmission mechanism has a stepped sleeve with a linear first portion and a slanted second portion, wherein the lower drive section of the rocker arm is seated on the slanted second portion so that during rotation of the rotary transmission mechanism the rocker arm articulates pendularly about the first pivotal axis.

BRIEF DESCRIPTION OF THE DRAWINGS

FIG. 3 is a perspective view of the first embodiment;
FIG. 3A is a cross-sectional view of the sleeve shown in FIG. 3 which connects the rocker arm to the rotary transmission mechanism;
FIG. 4 is a perspective view of a rocker cradle of the first embodiment;
FIG. 5 is a perspective view of a rocker arm of the first embodiment.

DESCRIPTION OF PREFERRED EMBODIMENTS

Figure 1:
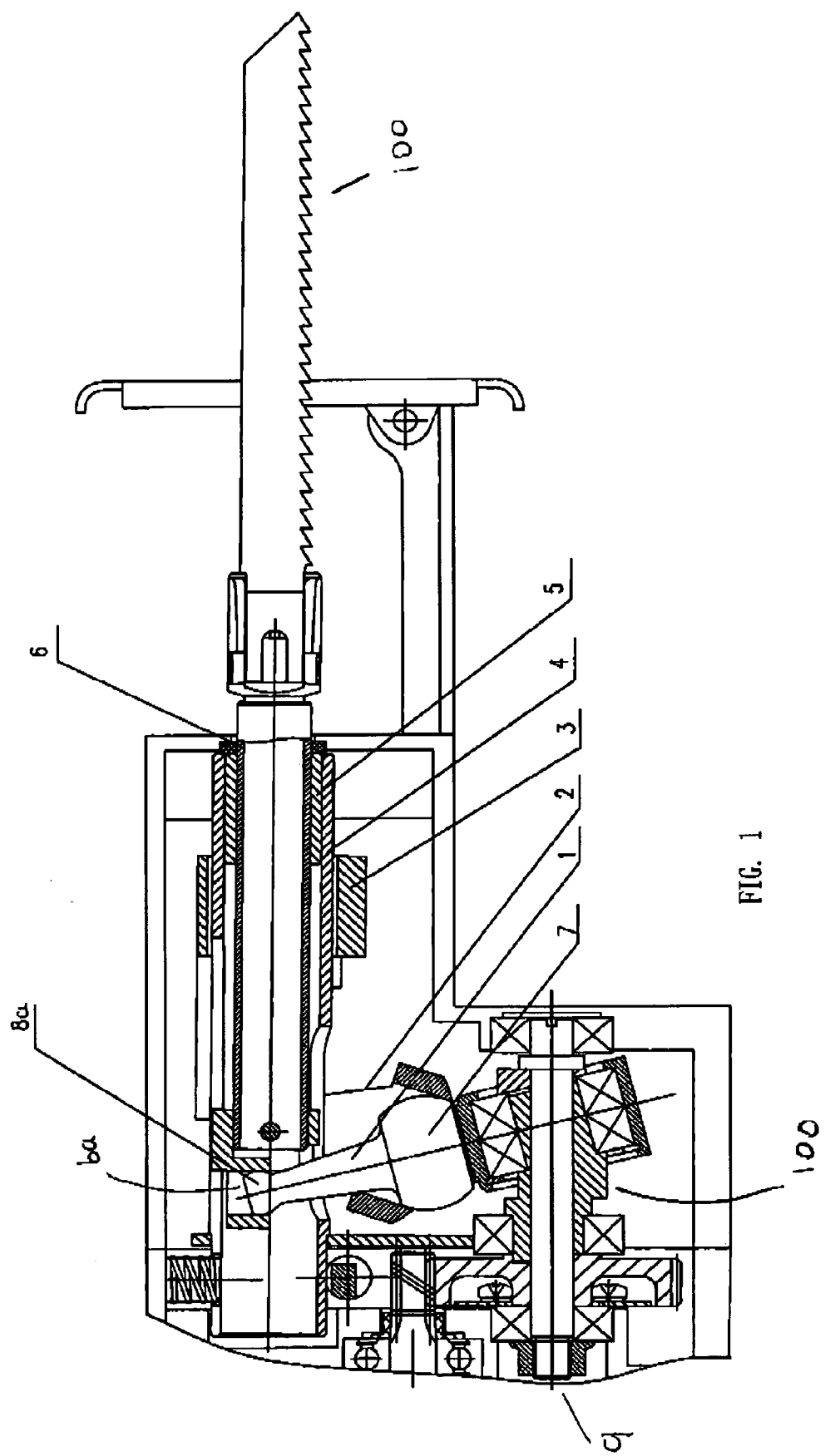
FIG. 1 is a cross-sectional view of a first embodiment of the present invention (rocking arm rocked backwards)
Figure 2:
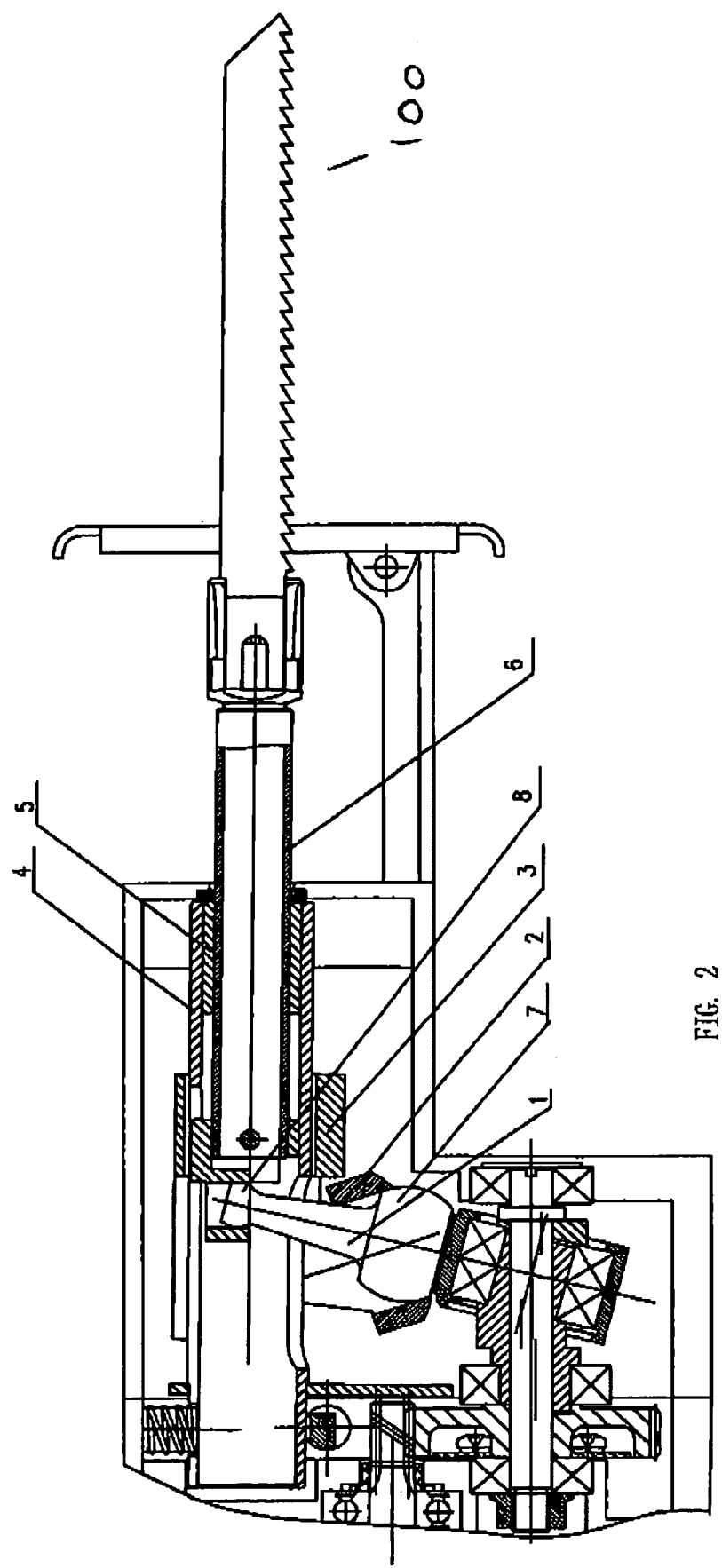
FIG. 2 is a cross-sectional view of the first embodiment (rocking arm rocked forwards)
Figure 7:
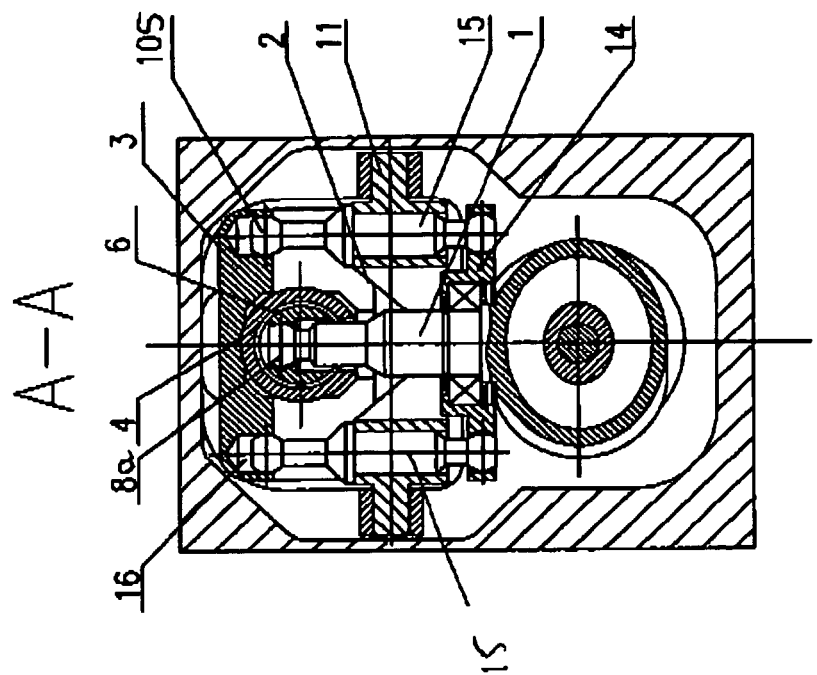
FIG. 7 is a cross-sectional view along A—A of FIG. 6.
Figure 6:
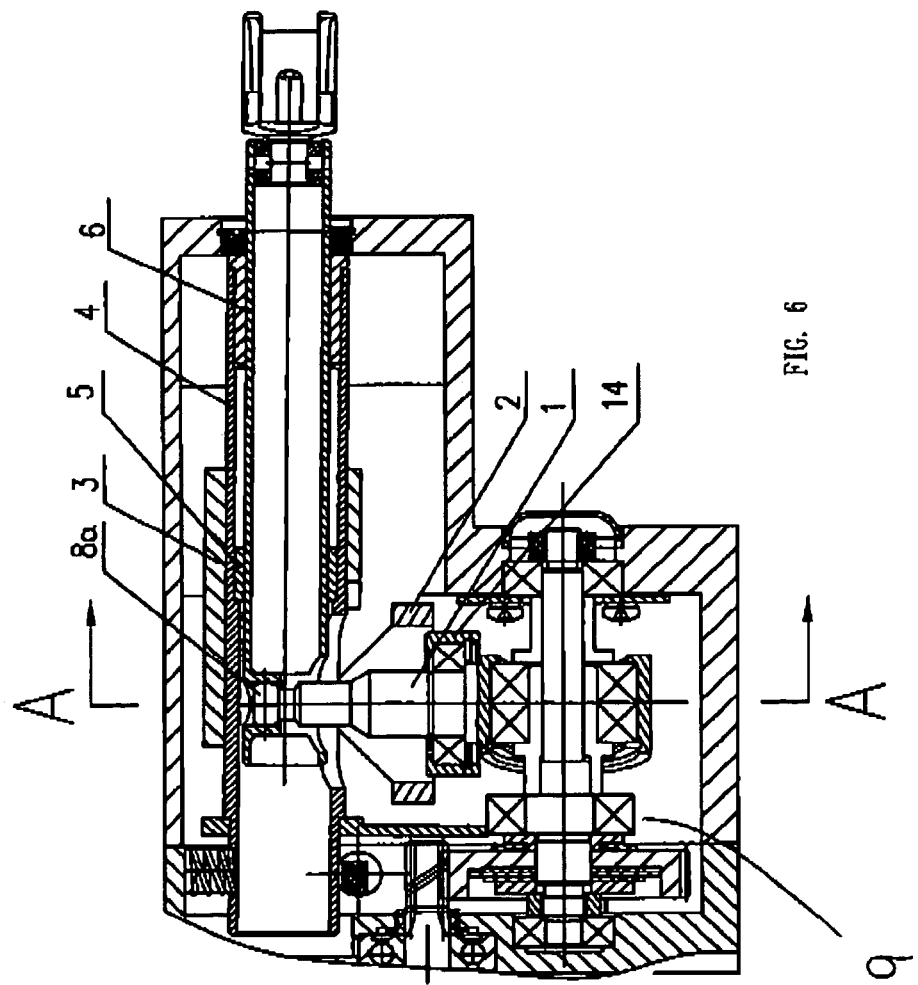
FIG. 6 is a cross-sectional view of a second embodiment of the present invention.
Figure 8:
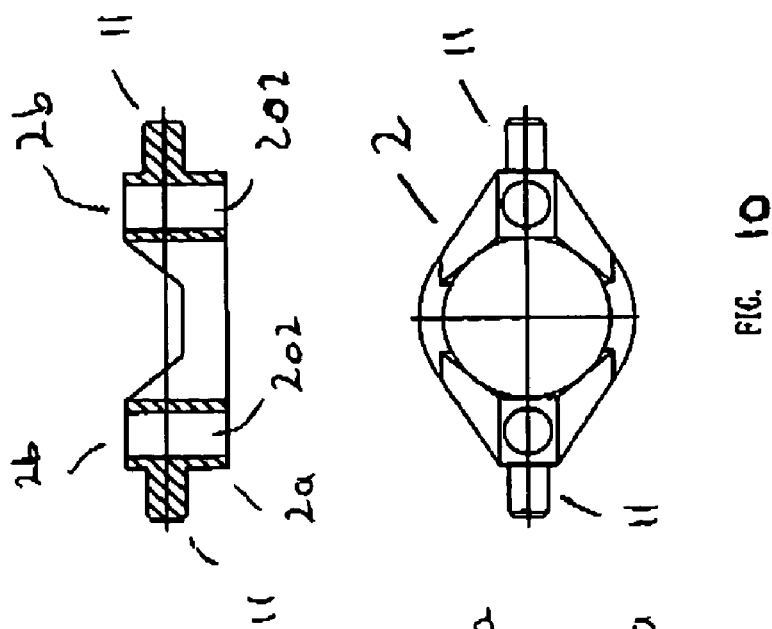
FIG. 8 is a side and front view of a rocker arm of the second embodiment.
Figure 9:
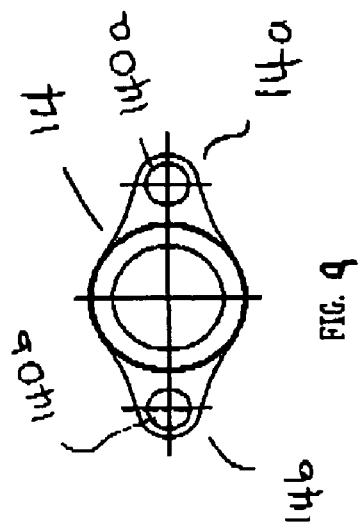
FIG. 9 is cross-sectional views of a sleeve of the second embodiment.
Figure 10:
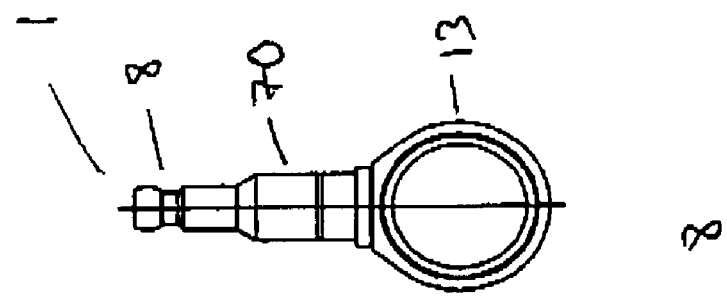
FIG. 10 is cross-sectional views of a rocker cradle of the second embodiment.

Embodiments of a counterbalance mechanism for a power tool illustrated in FIGS. 1–10 comprise a rotary transmission mechanism 9 housed in an elongate gear box. A lower drive section of a rocker arm 1 cooperates with the rotary transmission mechanism 9 so as to impart to the rocker arm 1 pendular articulateness about a pivotal axis transverse to the axis of the gear box. For this purpose, the rotary transmission mechanism 9 has a stepped sleeve 100 (shown in isolation in FIG. 3A) with a linear first portion 110 and a slanted second portion 120. The lower drive section of the rocker arm 1 is a cylinder 13 coupled to an elongate upper drive section 8 of the rocker arm 1 and seated on the slanted second portion 120. Rotation of the rotary transmission mechanism 9 causes the slanted second portion 120 to rock the rocker arm 1 backwards and forwards about the pivotal axis.

An elongate reciprocating rod 6 is slidably disposed axially in a sleeve 4 and slide bearing 5 in the gear box. Near to its proximal end, the reciprocating rod 6 couples the upper drive section 8 of the rocker arm 1 to an external cutting blade 100 at its distal end. For this purpose, the upper drive section 8 of the rocker arm 1 terminates in a ball 8a which is captured in a socket 6a near to the proximal end of the reciprocating rod 6.

The counterbalance mechanism further comprises a rocker cradle 2. The rocker cradle 2 has a lower section 2a extending axially into opposed twin legs 2b. Diametrically opposed twin pivots 11 extend radially outwardly from the twin legs 2b. The rocker cradle 2 is pivotally mounted on the gear box by the twin pivots 11 so as to be imparted with pendular articulateness about a pivotal axis along the twin pivots 11 transverse to the axis of the gear box.

A counterweight 3 is mounted radially on the reciprocating rod 6 and is capable of opposed parallel sliding movement relative to the reciprocating rod 6. The counterweight 3 has a box-like barrel body 3a extending axially rearwards into twin arms 3b, each arm 3b containing a socket 16.

The lower section 2a of the rocker cradle 2 (ie relative to the pivots 11) is operably connected or coupled to the rocker arm 1 such that the rocker arm 1 and the rocker cradle 2 are imparted with opposed pendular articulateness about their respective pivotal axes. In particular, when the rocker arm 1 is driven backwards and forwards by the rotary transmission mechanism 9, its upper drive section 8 rocks backwards to drive the reciprocating rod 6 backwards and forwards to drive the reciprocating rod 6 forwards. Concurrently, the backwards and forwards movement of the rocker arm 1 is transmitted to the lower section of the rocker cradle 2 in accordance with the first and second embodiments illustrated in FIGS. 1–5 and 6–10 respectively and described specifically hereinafter. More particularly in both embodiments, the rocker cradle 2 drives the counterweight 3 in the opposite direction to that of the movement of the reciprocating rod 6 so as to counteract the vibration produced by the reciprocating rod 6.

With reference to the first embodiment in FIGS. 1–5, the lower section 2a of the rocker cradle 2 is a part substantially spherical shell seated on a part spherical intermediate drive section 7 of the rocker arm 1. The part substantially spherical shell forms an internal drive surface 12 intimately contacting the surface of the part spherical intermediate drive section 7. The twin legs 2b of the rocker cradle 2 each terminate in a ball 10 which is captured in the socket 16 so that the upper section of the rocker cradle 2 (ie relative to the pivots 11) is connected to the counterweight 3. When the upper drive section 8 of the rocker arm 1 rocks backwards, the intermediate drive section 7 follows the movement but the upper section of the rocker cradle 2 rocks forwards and the counterweight 3 is driven forward opposite to the direction of movement of the reciprocating rod 6. Similarly, when the upper drive section 8 of the rocker arm 1 rocks forwards, the intermediate drive section 7 follows the movement but the upper section of the rocker cradle 2 rocks backwards and the counterweight is driven backwards opposite to the direction of movement of the reciprocating rod 6.

With reference to the second embodiment in FIGS. 6–10, an intermediate drive section 70 of the rocker arm 1 between the cylinder 13 and an upper drive section 8 is cylindrical. A sleeve 14 is mounted radially on the intermediate drive section 7. The sleeve 14 is cylindrical and extends radially outwardly into twin ears 14a, 14b. The twin ears 14a, 14b are provided with apertures 140a, 140b. The twin legs 2b of the rocker cradle 2 each contain a receiving bore 202

The rocker cradle 2 further comprises a pair of shift levers 15 whose function is similar to that of the twin legs 2b in the first embodiment. Each shift lever 15 has its lower portion received in the aperture 140a, 140b of the sleeve 14, passes through the receiving bore 202 of the rocker cradle 2 and terminates in a ball 105 which is captured in the socket 16 to connect its upper section to the counterweight 3.

The coupling of the lower drive section of the rocker arm 1 and the rocker cradle 2 by the sleeve 14 causes the direction of movement of the counterweight 3 to be opposite to that of the reciprocating rod 6. In particular, the rocker cradle 2 provides a rotational axis (see FIG. 7) about which the shift levers 15 rock oppositely to the rocker arm 1. When the upper drive section 8 of the rocker arm 1 rocks backwards, the sleeve 14 transfers motion to the shift levers 15 which rock forwards and the counterweight 3 is driven forward by the rocker cradle 2 opposite to the direction of movement of the reciprocating rod 6. Similarly, when the upper drive section 8 of the rocker arm 1 rocks forwards, the sleeve 14 transfers motion to the shift levers 15 which rock backwards and the counterweight is driven backward by the rocker cradle 2 opposite to the direction of movement of the reciprocating rod 6.

What is claimed is:

1. A counterbalance mechanism for a reciprocating power tool comprising:
    a rocker arm having a lower drive section and an upper drive section, wherein the lower drive section is radially mountable on a rotary transmission mechanism so as to impart to the rocker arm pendular articulateness about a first pivotal axis transverse to the axis of the rotary transmission mechanism,
    an elongate reciprocating rod capable of sliding movement in an axial direction, wherein the elongate reciprocating rod has a proximal end and a distal end and is capable of coupling the upper drive section of the rocker arm to an external cutting element at the distal end,
    a counterweight mounted radially on the reciprocating rod and capable of sliding movement in an axial direction opposite to the direction of sliding movement of the reciprocating rod,
    a rocker cradle pivotally mountable so as to be imparted with pendular articulateness about a second pivotal axis transverse to the axis of the rotary transmission mechanism, wherein the rocker cradle has an upper section engaged with the counterweight and a lower section operatively connected or coupled to the rocker arm so that the rocker arm and the rocker cradle are imparted with opposite pendular articulateness about the first and second pivotal axes respectively.

2. The counterbalance mechanism as defined in claim 1 wherein the upper drive section of the rocker arm terminates in a ball which is captured in a socket at or near to the proximal end of the reciprocating rod.

3. The counterbalance mechanism as defined in claim 1 wherein the lower section of the rocker cradle extends axially into opposed twin legs.

4. The counterbalance mechanism as defined in claim 1 wherein the rocker arm has an intermediate drive section between the lower drive section and the upper drive section and wherein the lower section of the rocker cradle forms an internal drive surface intimately contacting the external surface of the intermediate drive section.

5. The counterbalance mechanism as defined in claim 4 wherein the lower section of the rocker cradle is a part substantially spherical shell and the intermediate drive section of the rocker arm is a part substantially spherical intermediate drive section, wherein the part substantially spherical shell forms an internal drive surface intimately contacting the surface of the part substantially spherical intermediate drive section.

6. The counterbalance mechanism as defined in claim 3 wherein the counterweight has a barrel-like body extending axially rearwards into twin arms and each arm contains a socket, wherein the twin legs of the rocker cradle each terminate in a ball which is captured in the socket so that the upper section of the rocker cradle is connected to the counterweight.

7. The counterbalance mechanism as defined in claim 1 wherein the rocker arm has an intermediate drive section between the lower drive section and the upper drive section, said counterbalance mechanism further comprising:

a sleeve radially mounted on the intermediate drive section and connected to the lower section of the rocker cradle.

8. The counterbalance mechanism as defined in claim 7 wherein the rocker cradle further comprises a shift lever having an upper section and a lower section, wherein the lower section is connected to the sleeve and the upper section is connected to the counterweight.

9. The counterbalance mechanism as defined in claim 7 wherein the sleeve is annular and extends radially outwardly into twin ears.

10. The counterbalance mechanism as defined in claim 9 wherein the twin ears are provided with apertures and the twin legs of the rocker cradle each contain a receiving bore, wherein the rocker cradle further comprises a pair of shift levers, each shift lever has a lower portion, an upper portion and a middle portion therebetween, wherein the lower portion is received in the aperture of the sleeve, the middle portion passes through the receiving bore of the rocker cradle and the upper portion terminates in a ball which is captured in the socket so as to connect the shift lever to the counterweight.

11. A counterbalance mechanism which comprises a transmission mechanism disposed in a gear box, a sway arm with lower end rotationally sleeved engaged with the transmission mechanism, a reciprocating rod slidably disposed in the gear box and a counterweight which can perform parallel slide movement relate to the reciprocating rod, the upper drive section of the sway arm engages with the reciprocating rod; characterized in that: the counterbalance mechanism further comprises a sway rack pivoted engages with the gear box through its rotational axis, and its lower section relative to the rotational axis actively engages with the sway arm, its upper section relative to the rotational axis engages with the counterweight.

12. The counterbalance mechanism as defined in claim 11 wherein the lower section of the sway rack relative to the rotational axis forms a drive surface, the sway arm forms a middle drive portion, and the middle drive portion spherically contacts the drive surface.

13. The counterbalance mechanism as defined in claim 11 wherein a sleeve covers the section located between the lower section and the upper section of the sway arm, the sleeve connects to the lower section of the rack relative to the rotational axis.

14. The counterbalance mechanism as defined in claim 11 wherein the sway rack further comprises a shift lever with its lower portion connect to the sleeve and its upper portion connect to the counterweight.

15. A reciprocating power tool comprising:

an elongate gear box;

a rotary transmission mechanism housed axially in the elongate gear box;

an external cutting element; and a counterbalance mechanism housed in the elongate gear box comprising:

a rocker arm having a lower drive section and an upper drive section, wherein the lower drive section is radially mounted on the rotary transmission mechanism so as to impart to the rocker arm pendular articulateness about a first pivotal axis transverse to the axis of the gear box, an elongate reciprocating rod capable of sliding movement in an axial direction in the gear box, wherein the elongate reciprocating rod has a proximal end and a distal end and at or near to the proximal end couples the upper drive section of the rocker arm to the external cutting element at the distal end, a counterweight mounted radially on the reciprocating rod and capable of sliding movement in an axial direction in the gear box opposite to the direction of sliding movement of the reciprocating rod, and a rocker cradle pivotally mounted on the gear box so as to be imparted with pendular articulateness about a second pivotal axis transverse to the axis of the gear box, wherein the rocker cradle has an upper section engaged with the counterweight and a lower section operatively connected or coupled to the rocker arm so that the rocker arm and the rocker cradle are imparted with opposite pendular articulateness about the first and second pivotal axes respectively.

16. The reciprocating power tool as defined in claim 15 wherein the rotary transmission mechanism has a stepped sleeve with a linear first portion and a slanted second portion, wherein the lower drive section of the rocker arm is seated on the slanted second portion so that during rotation of the rotary transmission mechanism the rocker arm articulates pendularly about the first pivotal axis.

* * * * *